US009635021B2

(12) United States Patent
Smith

(10) Patent No.: US 9,635,021 B2
(45) Date of Patent: Apr. 25, 2017

(54) TRUSTED EPHEMERAL IDENTIFIER TO CREATE A GROUP FOR A SERVICE AND/OR TO PROVIDE THE SERVICE

(71) Applicant: Intel Corporation, Santa Clara, CA (US)

(72) Inventor: Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 62 days.

(21) Appl. No.: 14/574,847

(22) Filed: Dec. 18, 2014

(65) Prior Publication Data

US 2016/0182497 A1    Jun. 23, 2016

(51) Int. Cl.
    *H04L 29/06*     (2006.01)
    *H04L 9/32*      (2006.01)

(52) U.S. Cl.
    CPC ........ *H04L 63/0853* (2013.01); *H04L 9/3226* (2013.01); *H04L 63/0823* (2013.01)

(58) Field of Classification Search
    CPC .. H04L 63/0853; H04L 63/823; H04L 9/3247
    See application file for complete search history.

(56) References Cited

U.S. PATENT DOCUMENTS

| 8,799,656 B2 * | 8/2014 | Brickell | H04L 9/0844 380/282 |
| 2010/0205443 A1 * | 8/2010 | Zhao | H04L 9/3218 713/171 |
| 2012/0023334 A1 * | 1/2012 | Brickell | H04L 9/0844 713/169 |
| 2014/0162601 A1 * | 6/2014 | Kim | H04W 12/06 455/411 |
| 2014/0181995 A1 * | 6/2014 | Smith | G06F 21/6254 726/28 |
| 2014/0244996 A1 * | 8/2014 | Parthasarathy | H04L 63/104 713/150 |
| 2014/0283099 A1 * | 9/2014 | Smith | G06F 21/577 726/26 |

(Continued)

OTHER PUBLICATIONS

Wang, Bin, John Bodily, and Sandeep KS Gupta. "Supporting persistent social groups in ubiquitous computing environments using context-aware ephemeral group service." Pervasive Computing and Communications, 2004. PerCom 2004. Proceedings of the Second IEEE Annual Conference on. IEEE, 2004.*

(Continued)

*Primary Examiner* — Shawnchoy Rahman
(74) *Attorney, Agent, or Firm* — Jordan IP Law, LLC

(57) ABSTRACT

Devices and methods may provide for generating and/or using a trusted ephemeral identifier (TEID) to create a group for a service, and/or to provide the service. A verifier device may assign a value to a group that is to be created to provide the service, wherein the value may identify the group and may be issued to the prover device for use to generate the TEID value that is unique to the prover device and to participation of the prover device in the group. In addition, a prover device may generate the TEID value, wherein the TEID may be derived from a combination of a unique value that may be generated in a trusted execution environment (TEE) of the prover device and the value that may identify the group.

27 Claims, 5 Drawing Sheets

(56) References Cited

U.S. PATENT DOCUMENTS

2014/0316886 A1* 10/2014 Smith ................ G06Q 30/0257
                                                    705/14.49
2015/0358234 A1* 12/2015 Krieger .................. H04L 47/19
                                                    709/235

OTHER PUBLICATIONS

Waldvogel, Marcel, et al. "The VersaKey framework: Versatile group key management." IEEE Journal on selected areas in communications 17.9 (1999): 1614-1631.*

* cited by examiner

US 9,635,021 B2

TRUSTED EPHEMERAL IDENTIFIER TO CREATE A GROUP FOR A SERVICE AND/OR TO PROVIDE THE SERVICE

TECHNICAL FIELD

Embodiments generally relate to a trusted ephemeral identifier (TEID). More particularly, embodiments relate to creating a group for a service and/or providing the service using the TEID.

BACKGROUND

Internet of Things (IoT) devices may be fixed-function, relatively low cost devices with limited security capabilities. In addition, IoT devices may typically include sensors to sense environmental conditions. The data collected by IoT devices may, however, be aggregated or mined to reveal information that an owner of the IoT device may wish to keep private. For example, a globally unique identifier (GUID) used to identify an IoT device may correlate transactions involving use of the IoT device in a variety of applications or contexts. Thus, a thermostat may legitimately feed information to a first vendor (e.g., limited details) and a second vendor (e.g., full usage details), wherein the first vendor may collude with the second vendor to obtain more information (e.g., full usage details) using the GUID to obtain private information or to data mine.

In addition, GUIDs may be easily replayed, stored, and reused by any entity where the GUIDs are observed. For example, a counterfeit entity may hijack a GUID to masquerade as an IoT device and maliciously receive information from other entities, assume access rights to other entities, gain security keys, introduce content, and so on. Moreover, IoT environments may include a relatively large number of IoT devices where any/all participants may be privy to the GUID of any other IoT device. Thus, each IoT device may pose a security threat. In addition, an IoT device having the least amount of security hardening may relatively increase such security risks by being easily compromised to feed information regarding other IoT devices, which may in turn serve as attack points due to differing vulnerabilities.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
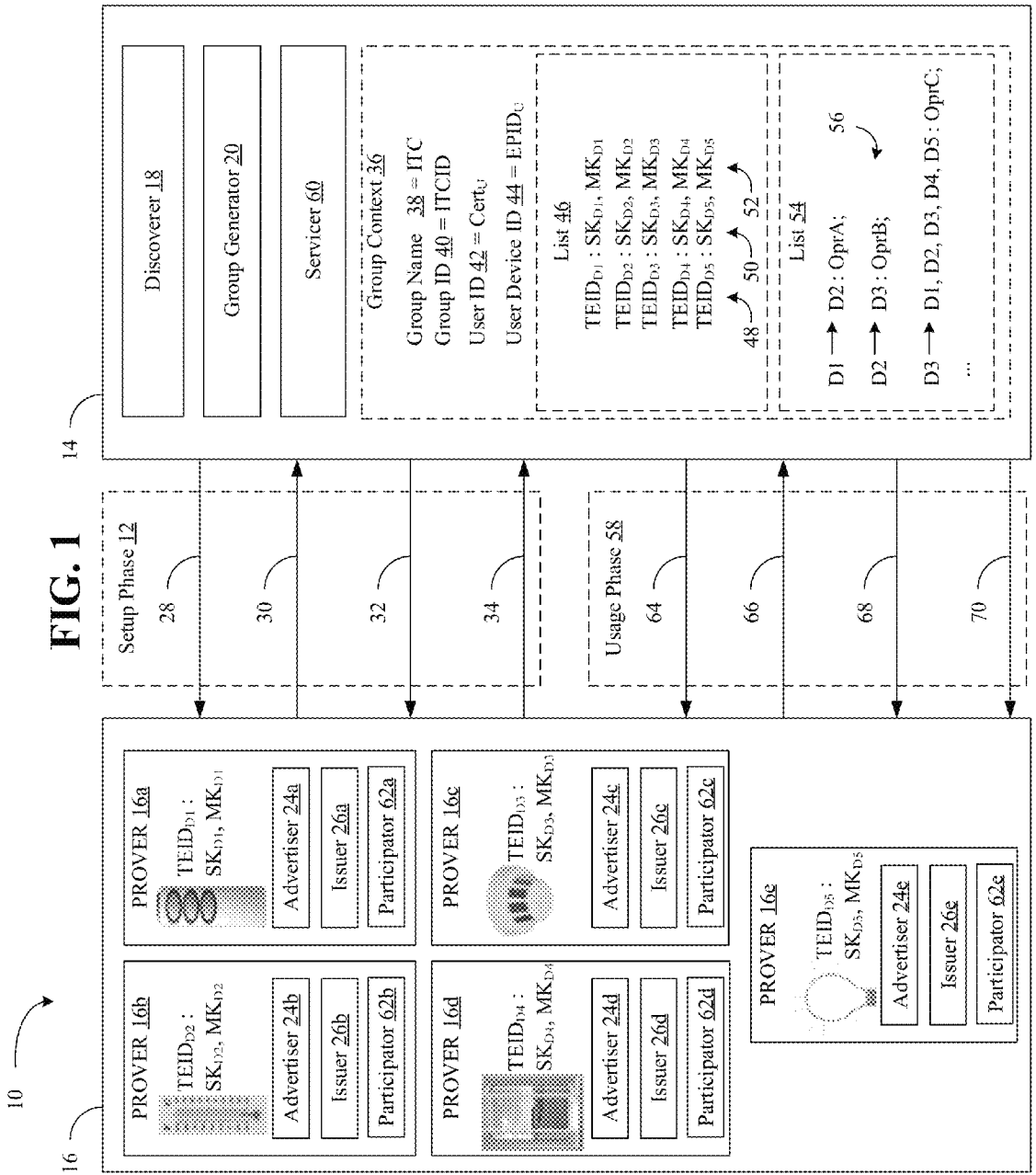
FIG. 1 is a block diagram of an example of a verifier device and a prover device to create a group for a service and/or to provide the service based on a trusted ephemeral identifier (TEID) according to an embodiment.

FIG. 1 shows an example of a system 10 to create a group for a service and/or to provide the service based on a trusted ephemeral identifier (TEID) according to an embodiment. During a setup phase 12, a verifier 14 may communicate with a prover 16 (16a-16e) to discover the prover 16, establish a trusted connection between the verifier 14 and the prover 16, and/or exchange information that may be used to create a grouping of resources to provide a service. As will be discussed in greater detail, the verifier 14 may establish whether the prover 16 is a member of a group, and the prover 16 may be an entity that is proving membership in the group, using a TEID. The verifier 14 may include software on a host device, a server on the Internet, a hardware platform, and so on. Thus, the verifier 14 may include a desktop computer, notebook computer, tablet computer, convertible tablet, personal digital assistant (PDA), mobile Internet device (MID), media player, smart phone, smart television (TV), game console, wearable computer, server, etc., and so on.

The prover 16 may include a hardware platform, such as a platform controller hub (PCH), a processor (e.g., central processing unit), and so on. In addition, the prover 16 may include an Internet of Things (IoT) device, which may be manufactured by various vendors that use the same or different hardware, firmware, software, etc. For example, the prover 16 may include a sensor such as a temperature sensor to sense temperature, a pressure sensor to sense pressure, a humidity sensor to sense humidity, a light sensor to sense light, and so on. The prover 16 may also include an actuator such as a window actuator to actuate a window, a window fixture actuator to actuate a window fixture, a door actuator to actuate a door, a vent actuator to actuate a vent, a faucet actuator to actuate a faucet, and so on. In addition, the prover 16 may include a controller such as a temperature controller to control temperature (e.g., thermostat), a light controller to control lighting (e.g., light switch), and so on.

In the illustrated example, the verifier 14 includes a smartphone including a discoverer 18 and a group generator 20. The prover 16 includes a prover 16a (thermostat), a prover 16b (temperature sensor), a prover 16c (smoke alarm), a prover 16d (window shade controller), and a prover 16e (light switch/controller), each including a respective advertiser 24 (24a-24e) and a respective issuer 26 (26a-26e). Notably, the verifier 14 may dynamically create a grouping of the provers 16a-16e to construct a group for a service and to provide the service using the grouping. In addition, the provers 16a-16e may generate a TEID for each group context in which the provers 16a-16e are usable to allow the provers 16a-16e to legitimately participate as members of a plurality of groups, which may include a same or a different grouping of members. The TEIDs may also substantially prevent an identity and/or a function/capability of the provers 16a-16e from being maliciously determined or compromised by evaluating the TEIDs.

Communication between the verifier 14 and the prover 16a will be discussed for the purpose of illustration, although the same communication may independently occur between the verifier 14 and the provers 16b-16e. In the illustrated example, the verifier 14 issues a discovery request 28 to the prover 16a. For example, a broadcast discovery protocol may be used to discover the prover 16a over a network (e.g., Ethernet, Wifi, etc.). In one example, the discoverer 18 may issue the broadcast request 28 for information from any prover 16 and the advertiser 24a may identify the broadcast request 28 to issue a response that provides a function/capability of the prover 16a. The response may also include an availability of the prover 16a, such as a current availability (e.g., use now, unavailable, etc.), a date range for availability, a time range for availability, and so on. In addition, the advertiser 24a may provide information to any verifier 14 independently of a discovery request, wherein the discoverer 18 may identify the information and determine a function/capability and/or availability of the prover 16a.

Similarly, a multicast protocol or a unicast protocol may be used to request or provide information based on any delimiting criteria including addressing (e.g., Internet Protocol, Virtual Local Area Network, Media Access Control, etc.), security zones, security policies, privacy policies, user settings, and so on. Thus, a function/capability and/or availability of the prover 16a may be provided as needed, such as when the discoverer 18 issues the discovery request 28 when a group is being created to provide a service that is to be offered in the future and/or that is presently needed. In addition, a function/capability and/or availability of the prover 16a may be provided on a predetermined or periodic basis, such as when the advertiser 24a automatically forwards information to the discoverer 18 at a predetermined period (e.g., time intervals, a capability change, an availability change, etc.) to be used when a group is being created to provide a service that is to be offered in the future and/or that is presently needed.

The information from the prover 16a regarding its function/capability and/or availability may also be managed (e.g., stored, provided, etc.) by a resource registry service to facilitate the discovery of the prover 16a. For example, the discoverer 18 may provide the received information regarding a function/capability and/or availability of the prover 16a to the resource registry service to be stored, which may then be accessed by any verifier 14 to discover the prover 16a. In addition, the resource registry service may publish information for the prover 16a that is relatively less private, wherein additional (e.g., private) information such as sensor data of the prover 16a may be further discovered after the prover 16a establishes that a requestor of the additional information is a group leader or another participant (e.g., member) of a same group as the prover 16a.

A trusted connection may be established for each prover 16 that is discovered. For example, a virtual private network may be established by forming a trusted connection between the verifier 14 and the prover 16a over a wide area network (WAN) or local area network (LAN) using internet protocol security (IPSec) to exchange confidential data. In addition, confidential information may be exchanged by forming a trusted connection between the verifier 14 and the prover 16a using Rivest Shamir Adleman (RSA) algorithm, secure hash algorithm (SHA), message-digest algorithm (MD5), and so on. A Sigma protocol may also be used to establish a trusted connection between the verifier 14 and the prover 16a. Generally, the Sigma protocol may define a session key exchange to allow two parties to use symmetric encryption and integrity protection to exchange confidential data. The session key exchange of the Sigma protocol may be in the form of the Diffie-Hellman (DH) protocol.

In the illustrated example, the issuer 26a issues a first Sigma (S1) message 30 to the group generator 20 that may include a group identifier (GID) value for an enhanced privacy ID (EPID) group and a first DH message $g^D$. The GID value may be an n-bit number (e.g., n=32) that represents, e.g., a class of hardware (e.g., System-On-Chip version x). As discussed below, an EPID may include a private key embedded in, e.g., the particular hardware part within the class of hardware. Also, $g^D$ may be a public DH key derived from a DH private key D of the prover 16a, which may be a random or pseudo random n-bit number (e.g., n=512). Thus, the S1 message 30 may include $\{GID, g^D\}$, wherein the GID may provide some trust for the prover 16a to the verifier 14 and may be used to begin a registration of the prover 16a as a member of a group.

In response, the group generator 20 issues a second Sigma (S2) message 32 to the issuer 26a that may include a second DH message $g^U$, which may be a public DH key H derived from a DH private key of the verifier 14 that may be a random or pseudo random n-bit number. The group generator 20 may also serialize data to be stored or transferred to other entities. For example, the group generator 20 may concatenate $g^D$ and $g^U$ into a single message ($g^D\|g^U$) and sign the message using a certificate $Cert_U$ of the verifier 14 to produce $Cert_U$-$Sig(g^D\|g^U)$, which may be added to the S2 message 32. The certificate $Cert_U$ identifies the verifier 14, and may utilize a second GID for an EPID group or a traditional X.509 certificate issued by a Certificate Authority/Registration Authority. Thus, the issuer 26a may trust and/or verify the DH values since they are signed using a legitimate certificate $Cert_U$.

The group generator 20 may also add to the S2 message 32 an identifier that is selected and supplied by the verifier 14 (e.g., as a group leader) to identify a group to which the prover 16a may be solicited for participation. For example, the group generator 20 may assign (e.g., choose) Basename=Indoor Temperature Control Service Identifier (ITCID) for a group to which the prover 16a may be solicited for participation to provide a service of indoor temperature control (ITC). The value ITCID may be a value of arbitrary length. Thus, the S2 message 32 may include $\{Cert_U\text{-}Sig(g^D\|g^U), Basename=ITCID\}$. Notably, since the value ITCID is provided over the secure channel and/or includes a message that is signed by the certificate $Cert_U$, the issuer 26a may trust that the value ITCID is legitimate. The issuer 26a may also verify the S2 message 30 by verifying the $Cert_U$ and/or the signature of message ($g^D\|g^U$).

In the illustrated example, the issuer 26a generates a third Sigma (S3) message 34 that may include an EPID signature using a private EPID key ($EPID_D$) over the DH values to generate $EPID_D$-$Sig(g^D\|g^U)$. The private EPID key may be issued by an entity (e.g., manufacturer of a hardware part) and stored in compressed form in fuses of the prover 16a. The private EPID key may also be generated based on the GID value and stored without compression. Notably, a plurality of EPIDs may be verified using a single public key such as, for example, a certificate that has bound to it the GID value. Thus, the verifier 14 may rely on the certificate bound with the GID to confirm that the EPID value $EPID_D$ used to sign the message is from a legitimate entity. In addition, the verifier 14 may trust and/or verify the DH values using the certificate (e.g., the public key) bound to the GID since they are signed by the legitimate EPID value $EPID_D$.

The issuer 26a may also add to the S3 message 34 a value containing an attestation proof of a trusted execution environment (TEE) of the prover 16a to prove that the device 16a has not been compromised (e.g., by malware). The TEE may include, for example, a processor instruction environment, security environment, system management mode environment, virtualization environment, virtual machine monitor environment, and so on. Thus, a Taskinfo value may include a hardware name or version number, firmware name or version number, software name or version number, cryptographic hash values of executing code, configuration data, and so on. In addition, the Taskinfo value may include a capability, an attribute, a supported interface, any or all information that may be supplied by the resource registry service, and so on.

In one example, the issuer 26a may choose Taskinfo=Vendor TEE for a TEE within the prover 16a that is provided by a particular vendor (e.g., Intel® TEE), and add the Taskinfo value to the S3 message 34 to provide an attestation proof of vendor hardware, vendor software, and so on. Notably, since the Taskinfo value is provided over the secure channel and/or includes a message that is signed by a legitimate EPID value $EPID_D$, the group generator 20 may trust that the Taskinfo value is legitimate and use the Taskinfo value to determine a level of trust for the TEE.

The issuer 26a may also add to the S3 message 34 a TEID value that may be unique (e.g., specific) to the prover 16a and it's participation in an application of the verifier 14 (e.g., in a group leader's IoT service application). The issuer 26a may provide the TEID value to announce that moving forward the TEID value is the identifier that the verifier 14 may use to recognize the prover 16a and that the prover 16a will respond to. Notably, since the TEID value is provided over the secure channel and/or includes a message that is signed by a legitimate EPID value $EPID_D$, the verifier 14 may trust that the TEID value is legitimate.

As discussed in greater detail below, the issuer 26a may generate a TEID value by combining a MasterID value generated by the issuer 26a with the Basename value supplied by the verifier 14. Thus, the issuer 24a may generate and add a TEID value $TEID_{D1}$ to the S3 message 34, which may be a value unique (e.g., specific) to the prover 16a (e.g., a particular TEE) and the participation of the prover 16a in a particular service that may be offered by the verifier 14 (e.g., ITC service). In one example, the S3 message 34 may include $\{EPID_D\text{-Sig}(g^D\|g^U),$ Taskinfo=Intel TEE, $TEID_{D1}\}$.

The issuer 24a may refuse to provide the S3 message 32 if the issuer 24a determines that participation in a group would compromise a privacy policy, a security policy, and so on. In one example, the Basename value may be associated with a particular vendor (e.g., utility company, etc.) and a user of the prover 16a (e.g., device owner) may indicate that they do not wish to participate (e.g., release data, execute operations, etc.) in a group that provides a service associated with the vendor or a type of vendor. Also, the Basename value may be a GID value that the user of the prover 16a may not wish to use for registration and/or participation. The issuer 26a may evaluate the policy (e.g., privacy, security) to prevent participation, wherein the prover 16a does not require conscripted participation against the policy. The prover 16a may also be selectively anonymous to various types of entities based on a policy.

The group generator 20 may verify the S3 message 34 by, for example, verifying that $g^D$ is the same one that arrived in the S1 message 30. In addition, the group generator 20 may verify the S3 message 34 by, for example, verifying the EPID signature of the message $(g^D\|g^U)$. Moreover, the group generator 20 may verify the S3 message 34 by, for example, verifying the Taskinfo value. Thus, the verifier 14 (e.g., group leader) may establish a legitimate membership in a group involving each prover 16 (e.g., IoT sensor, IoT actuator device, etc.) as participants of the group.

In the illustrated example, the group generator 20 maintains, for a group context 36 (e.g., ITC Group Context), a group name 38 (e.g., Group Name=ITC), a GID 40 (e.g., Group ID=ITCID), a user ID 42 (e.g., User ID=$Cert_U$), and a user device ID 44 (e.g., User Device ID=$EPID_U$). The group generator 20 (e.g., as a group leader) may also maintain a list of TEID values for each prover 16 that is a participant (e.g., member) of a group, which may traditionally occupy scarce resources. The TEID values may be the only identifiers for each prover 16 of the group. Also, each prover 16 (e.g., IoT device) may scale to a relatively large number (e.g., millions) of IoT applications per device without unnecessarily wasting resources (e.g., memory) at the prover 16.

In the illustrated example, the group generator 20 maintains, for each group in the group context 36, a list 46 of TEID values 48 $TEID_{D1}, TED_{D2}, TEID_{D3}, TEID_{D4}, TEID_{D5}$ as the only identifiers for each participant (e.g., member) of the group corresponding to the group context 36 (e.g., a list of group devices for an ITC service). The group generator 20 also maintains, for each member of the group identified in the list 46 by the TEID values 48, a corresponding Sigma session key (SK) 50 and a Sigma MAC key (MK) 52. For example, the SK 50, with a value of $SK_{D1}$, and the MK 52, with a value of $MK_{D1}$, is stored for the prover 16a identified by the TEID value 48 $TEID_{D1}$.

A second group leader, such as a different runtime environment of the same verifier 14 or a different device, may maintain a second list of TEID values for members of a second group that may correspond to a different group context than the group context 36. The second list of TEID values may be different from the list 46 of TEID values 48, and therefore it may not be possible to discover overlapping devices by comparing the members of the group in the list 46 with the second group since the TEID values 48 in the list 46 may be different than the TEID values in the second list, even though there may be overlap in membership between the groups. Thus, attacks on privacy from colluding groups may be substantially prevented. In addition, security attacks may be substantially prevented involving shared IoT devices that may participate in multiple IoT/distributed applications (e.g., services). For example, no information may be mined from a usage context or appearance of the TEID since the TEID may be unique to a group context and may change from one usage context to another for the same device. In addition, a MasterID value-Basename value combination may not be used twice to generate a same TEID since participants may recognize a possibility of collision.

In the illustrated example, the group generator 20 also maintains, for the group corresponding to the group context 36, a list 54 of group operations 56. For example, the group generator 20 may maintain in the list 54 an operation A that may be executed based on an interaction between the prover 16a and the prover 16b (D1 to D2: OperA). Thus, for example, the operation A may be executed when the prover 16a (e.g., device D1) interacts (e.g., read, write, execute, etc.) with the prover 16b (e.g., device D2) based on the interaction defined in the list 54 (e.g., D1 to D2). The list 54 may be generated based on, e.g., prover availability, prover capabilities, resource assignments, rule sets, privacy policies, security polices, and so on. Also, the list 54 may be generated and/or modified before and/or after the service is initiated to direct the operations to be performed when the service is provided and/or to monitor the operations being performed.

The TEID values utilized as device identifiers, session identifiers, user identifiers, etc., may be ephemeral (e.g., temporary). In this regard, the context in which the TEID is used may determine the lifespan and/or relevance of the TEID. For example, the existence of a particular TEID used may be based on the existence of a particular usage context. Thus, a particular TEID may cease to exist when its corresponding usage context ceases to exist. In addition, a particular TEID may cease to exist when a function/capability that contributes to a usage context ceases to exist. The TEID may also cease to exist when the verifier 14 determines that it no longer needs the function/capability, such as when another device replaces the function/capability, when the frequency of use of the function/capability falls below a certain threshold, and so on.

The TEID may also cease to exist when the prover 16 determines that it no longer wishes to participate in a group due to, for example, evolving resource allocation considerations, security policy changes, privacy policy changes. In this regard, the verifier 14 and the prover 16 may communicate to agree on the appropriate time to remove a particular TEID, or negotiate a mutually agreed upon action (e.g., address concerns, update group, update rule sets, etc.) to continue to use the prover 16 for the service. In addition, the TEID may cease to exist upon expiration of a timer for the TEID, which may be defined by a user, a policy, and so on.

During a usage phase 58, the verifier 14 may communicate with the prover 16 to request a session and/or information for participation with the group context 36 (e.g., for use with ITC service), to assign interaction rules between members of the group, and/or to initiate a service. For example, a servicer 60 of the verifier 14 may communicate (e.g., via broadcast, multicast, unicast, etc.) with a respective participator 62 (62a-62e) of the prover 16 (16a-16b) during the usage phase 58. Communication between the verifier 14 and the prover 16a will be discussed for the purpose of illustration, although the same communication may independently occur between the verifier 14 and the provers 16b-16e.

The servicer 60 may detect that a particular service is needed. For example, the servicer 60 may render a user interface (UI) to provide options which when selected may specify the service needed, create the service needed, and so on. In one example, the verifier 14 may include a display to allow the servicer 60 to visually render the options and receive user input (e.g., touch screen command, pointer command, etc.) that specifies the service needed. In another example, the verifier 14 may include a microphone or speaker to allow the servicer 60 to audibly render the options and receive user input (e.g., voice command, etc.) that specifies the service needed. The servicer 60 may automatically recognize participant devices using discoverable information obtained during the setup phase 12 when a service is needed. Thus, the servicer 60 may detect that a service to control indoor temperature is needed, and automatically recognize from the list 46 the TEID values 48 $TEID_{D1}$, $TEID_{D2}$, $TEID_{D3}$, $TEID_{D4}$, $TEID_{D5}$ for a group of the group context 36 that can be used to supply the ITC service.

In the illustrated example, the servicer 60 issues a participation request 64 to the participator 62a for information regarding use of the prover 16a with an ITC service over a Sigma protocol. In this regard, a previous Sigma session may be restarted using previous keys or a new sigma session may be established using new keys. The servicer 60 may also request additional information from the participator 62a such as, for example, invocation of exposed interfaces of the prover 16a. In addition, the servicer 60 may request that the participator 62a expose hidden device interfaces. A request may be granted by the participator 62a upon satisfaction of an authentication using one or more keys, e.g., previously negotiated during the setup phase 12, by supplying TEID values shared during the setup phase 12, and so on.

In the illustrated example, the servicer 60 adds to the participation request 64 information that was obtained during the setup phase 12, such as a message $\{TEID_{D1}, ITCID\}$, to assert the belief of the verifier 14 that the prover 16a is the device associated with the TEID value $TEID_{D1}$. The participation request 64 may be issued to the participator 62a using the SK 50 with the value of $SK_{D1}$ and the MK 52 with the value of $MK_{D1}$. The SK 50 may be used as a symmetric encryption/decryption key for all data passed between verifier 12 and prover 16a after a Sigma session is established, and the MK 52 may be used to generate MAC's of the messages sent between the verifier 14 and the prover 16a. Thus, the SK 50 with the value of $SK_{D1}$ may include an n-bit key (n=128) to be used as a session integrity key during the usage phase 58 and the MK 52 with the value of $MK_{D1}$ may include an n-bit key (n=128) to be used as a session confidentiality key during the usage phase 58.

The participator 62a may verify the TEID value $TEID_{D1}$ received in the participation request 64. In one example, the participator 62a may re-derive the TEID value $TEID_{D1}$ using the unique MasterID value that is kept secret by the TEE of the prover 16a and the Basename value ITCID supplied by the verifier 14. The participator 62a may also access the TEID value $TEID_{D1}$ from data storage (e.g., persistent memory) when, for example, there may not be storage concerns. The participator 62a may also compare the received TEID value from the verifier 14 and the re-derived or the retrieved TEID value to determine whether a match exists. In the illustrated example, the participator 62a issues a participation reply 66 to the servicer 60 to confirm that the prover 16a is associated with the $TEID_{D1}$. In addition, the participation reply 66 may include an acknowledgment of the TEID value and the Basename value as a session identifier. The participation reply 66 may also include an assignment of a function/capability of the prover 16a to, for example, the service during its participation within the group context 36 to provide the service.

The servicer 60 may issue an interaction message 68 to specify interaction rules between the provers 16a-16e for providing service. For example, the servicer 60 may assign capabilities or constraints on capabilities for the prover 16a using the established secure channel. In one example, the servicer 60 may assign access privileges or constraints on access privileges including read privileges, write privileges, execute privileges, and so on. Thus, the prover 16a may allow members in the group to write to a memory location of the prover 16a, such as when the prover 16b writes a temperature value, and restrict other members from executing at the prover 16a, such as when the prover 16a retains exclusive control to modulate a heating, ventilating, and air conditioning (HVAC) system via its heating-cooling interface.

The servicer 60 may also provision a rule set describing members of the group (e.g., peer devices) and their interfaces that may be invoked, and add the rule set to the interaction message 68. For example, a rule set may describe the prover 16d as a window shade controller and an interface that may be invoked such as a shade drop-lift interface. Thus, the access privileges, constraints, and/or rule sets may be determined in real-time based on availability of members of the group, capability assignments, constraints, context in which the members of the group are used, security policies, privacy policies, and so on. In addition, the access privileges, constraints, and/or rule sets may be predetermined and applied statically for the service provided. In addition, the access privileges, constraints, and/or rule sets may be used to generate and/or modify the list 54.

In the illustrated example, the servicer 60 issues the interaction message 68 for the service (e.g., ITC service), wherein the interaction message 68 may indicate group membership to provide the service, read-write-execute (rwx) information, group keys to be used during interactions (e.g., symmetric keys for device-to-device interactions), and so on. Thus, the interaction message 68 may include {TEID$_{D1}$: TEID$_{Dx}$, rwx, grp key, ... }, wherein TEID$_{Dx}$ may include TEID$_{D5}$ such that the provers 16a-16e identified by the TEID values 48 TEID$_{D1}$, TEID$_{D2}$, TEID$_{D3}$, TEID$_{D4}$, TEID$_{D5}$ are recognized as participants in the particular group corresponding specifically to the group context 36 that may be used to supply the ITC service.

In the illustrated example, the servicer 60 also issues an initiation message 70 to initiate the ITC service, which when received by the participants (e.g., members) of the group that have agreed to participate in the ITC service cause the participants to make accessible (e.g., begin to utilize) their functions/capabilities. For example, the participator 62b may read the temperature of an indoor area (e.g., a temperature zone of a home, etc.) and write the sensed temperature to its data storage to be read by the participator 62a, which may cause the participator 62a to access its heating-cooling interface to the HVAC system to control the temperature of the area. Also, the participator 62a may access a window fixture interface of the prover 16d (e.g., a shade drop-lift interface) to execute a window shade operation that may facilitate the desired change or control in temperature (e.g., open window shade to heat up the area, etc.).

In a further example, the participator 62d may write a status value of a register associated with the window fixture interface, or the participator 62e may read the status value from the register, to access its own light switch interface and modulate lighting in the area (e.g., turn on light when a window shade is closed). In this regard, other IoT devices may be utilized that may not be in the group corresponding to the group context 36, such as a motion sensor that is not in the group but may communicate with, e.g., the participator 62e to facilitate a decision to modify lighting further based on a presence or absence of a user in the room. Such an interaction may be approved by the verifier 14 in real-time (e.g., as a proxy) or may be pre-approved based on, for example, an evaluation of exposed interfaces that are supported, a constraint on access over the interface (e.g., only unidirectional read from other devices using an interface for the service), and so on. The verifier 14 may also initiate a setup phase to require that the other IoT devices be added to the group for the group context 36, and/or to create another group including the other devices to ensure that the source of the data may be trusted.

Additionally, the servicer 60 may invoke the participator 62a to enter different operational states, such a peer-to-peer operational state to be available for peer-to-peer interoperation. In this case, the verifier 14 (e.g., as the group leader) need not remain a broker, a proxy, or a redirect agent during the ITC service. Thus, the provers 16a-16e may operate without the need to refer back to the verifier 14 for approval or instructions, and may implement their functionality/capabilities based on peer-to-peer operations, e.g., in accordance with any access rights, constraints, rule sets, group keys, etc., that may exist. The servicer 14 may, however, re-assert a mode switch that requires the provers 16a-16e to discontinue peer-to-peer operation.

Figure 2:
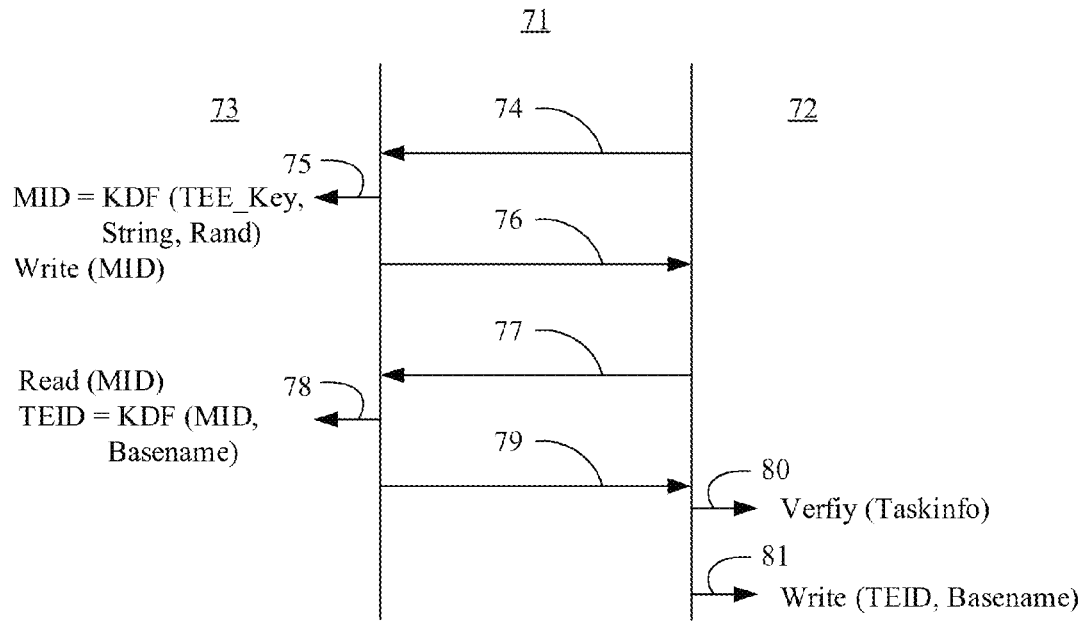
FIG. 2 is a flowchart of an example of a setup protocol to register a prover device with a verifier device based on a TEID for participation in a group that is created to provide a service according to an embodiment.

Turning now to FIG. 2, an example of a setup protocol 71 is shown according to embodiments between a verifier device 72 (e.g., domain controller) and a prover device 73 (e.g., IoT device) to register the prover device 73 based on a TEID for participation in a group that is created to provide a service. The verifier device 72 may include the verifier 14 and the prover device 72 may include the prover 16 (FIG. 1), discussed above. In the illustrated example, the verifier device 72 issues a request 74 to the prover device 73 for a new domain-specific identifier, which may include an identifier specific to a computing platform, such as a TEID value. The TEID value may be constructed from primitive values contributed by the two protocol participants, wherein the primitive values that are contributed may be recognizable as a value each participant has contributed.

The prover device 73 may use an instruction 75 to generate a random or pseudo random unique number (e.g., MasterID (MID)) in a TEE of the prover device 73. For example, the MasterID value may be generated using a random number generator (RNG), a pseudo random number generator (PRNG), and so on. Such number generators may be used to ensure each MasterID value is unique within a relatively large number space. In one example, the RNG and/or PRNG may include software such as a /dev/random and/or /dev/urandom generator, a yarrow-based generator, an entropy gathering daemon (EGD) generator, and so on. The RNG and/or the PRNG may also include hardware such as, for example, Intel® Digital Random Number Generator (DRNG), a shift register (e.g., a linear feedback shift register, etc.), and so on.

Additionally, a block cipher may be implemented to generate random or pseudo random numbers. For example, advanced encryption standard (e.g. AES256) counter mode (CTR) may be used to generate the MasterID value. In one example, the MasterID value may be derived using a key derivation function (KDF) or a mixing function including, for example, a SHA-2 hash function, HMAC, cipher MAC (CMAC), One-key MAC (OMAC), etc, to combine a random or pseudo random number with a string (String) and an internal TEE key (TEE_key) that is part of the TEE. Thus, the instruction 75 may execute an operation MID=KDF (TEE_key, String, Rand), which may also include an operation Write (MID) to write the MasterID value to local persistent memory, such as TEE persistent memory. In this regard, the TEE may include a storage device (e.g., register, cache memory, main memory, hard disk, drive, etc.) to store the MasterID. In one example, the MasterID may be generated at boot up and stored in, e.g., flash memory.

The MasterID value may not be exposed outside of the TEE, and therefore the identity of the prover device 73 may not be maliciously discovered or compromised. Moreover, since the Master ID value may be kept secret within the TEE of the prover device 73, there may be no way for the MasterID value to be used in the commission of an attack on privacy or security without a compromise of the TEE that protects the MasterID value. Thus, the MasterID value may be obtained from within the TEE of the prover device 73 to prevent an unauthorized entity from creating a counterfeit or twin device without knowledge and/or approval of the verifier device 72.

Additionally, a Sigma protocol including an attestation feature may be used to prove to the verifier device 72 that the MasterID value is contained within the TEE of the prover device 73 and is not revealed. In the illustrated example, the prover device 73 issues an S1 message 76 to the verifier device 72 and in response the verifier device 72 issues an S2 message 77 to the prover device 73, which may include a Basename value (Basename=ITCID) identifying a group to which the prover device 73 is to belong for a particular usage context. The prover device 73 may use an instruction 78 to implement a TEID generation process in the TEE of the prover device 73 in which the MasterID value may be combined with the Basename value. For example, a KDF may be applied to combine the MasterID value with the Basename value. Thus, the instruction 78 may execute an operation TEID=KDF (MID, Basename), which may include an operation Read (MID) when the MasterID is locally stored.

In addition, the device prover 73 and/or a support service may verify that properties (e.g., privacy property) of the Basename are acceptable before the prover device 73 uses the Basename value to generate the TEID value in the TEE, facilitating a decision by the device 73 to decline participation. The prover device 73 may also store (e.g., cache) Sigma session keys for later use. In the illustrated example, the prover device 73 issues an S3 message 79 to the verifier device 72, which may include the TEID value computed by the prover device 73 and a Taskinfo value for the TEE. Thus, the verifier device 72 may use an instruction 80 to verify the Taskinfo value (e.g., attestation proof). In one example, the instruction 80 may execute an operation Verify (Taskinfo) to determine a level of trust for the TEE.

Additionally, the verifier device 72 may use an instruction 81 to save the TEID value received in the S3 message 79, alone or in combination with the Basename value. Accordingly, the verifier device 72 may use the instruction 81 to execute an operation Write (TEID, Basename), and maintain a resource list of participant resources that may be disambiguated from other resources but that may not disclose identity values usable to correlate or collude with other domain controllers. In this regard, the verifier device 72 may include a storage device (e.g., register, cache memory, main memory, hard disk, drive, etc.) to store the TEID, the Basename, and so on. Moreover, the verifier device 72 may store (e.g., cache) Sigma session keys for later use. Thus, the setup protocol 71 may result in session keys derived by DH protocols including session keys for message encryption, message integrity, directional specific message exchange (e.g., sender keys, receiver keys), and so on. In addition, the setup protocol 71 may result in a TEID value and/or a grouping of IoT devices for a service.

Figure 3:
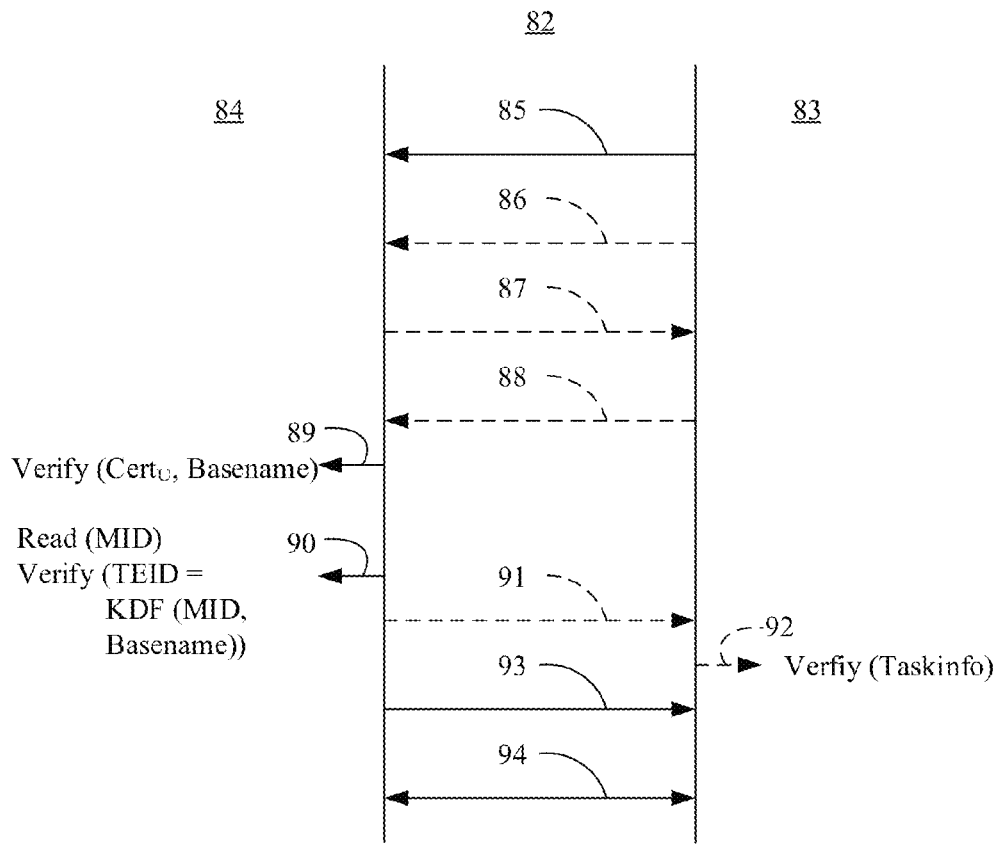
FIG. 3 is a flowchart of an example of a usage protocol to solicit and/or establish proper participation of a prover device by a verifier device based on a TEID in a group that is created to provide a service according to an embodiment.

FIG. 3 shows an example of a usage protocol 82 to solicit and/or establish proper participation based on a TEID in a group that is created to provide a service (e.g., usage context) according to embodiments. In the illustrated example, a verifier device 83 (e.g., a domain controller) issues, to a prover device 84 (e.g., an IoT device), a request 85 to create a session. The verifier device 83 may include the verifier 14 and the prover device 85 may include the prover 16 (FIG. 1), discussed above. In addition, the request 85 may include a TEID value previously obtained by the domain controller 83 and a Basename value (TEID, Basename) that was supplied by the domain controller 83 and used by the device 84 to generate the TEID value during a setup phase. Notably, once a session is negotiated, the session may be subsequently used to restart a previously established session context. For example, a secure channel may be opened between the verifier device 83 and the prover device 84 using previously negotiated Sigma session keys. In one example, the verifier device 79 may issue a request 86 for an attestation report from the device 84 to refresh the session keys.

A stateless model may also be supported for the session between the verifier device 83 and the prover device 84. For example, new Sigma session keys may be re-derived using a Sigma/DH protocol, wherein the TEID value may be re-calculated using a MasterID and the Basename. Thus, the prover device 84 may issue an S1 message 87 to the verifier device 83 and in response the verifier device 83 may issue an S2 message 88 back to the prover device 83. In the restart model and/or the stateless model, the prover device 84 may use an instruction 89 to verify a certificate and/or the Basename value of the verifier device 84. Thus, the instruction 89 may execute an operation Verify (Cert$_U$, Basename). In one example, the prover device 84 may communicate with a service to verify the certificate and/or the Basename, properties thereof, and so on.

The prover device 84 may also use an instruction 90 to verify the TEID value received in the request 85 from the verifier device 83. For example, a KDF may be applied to combine a MasterID value with the Basename value. Thus, the instruction 90 may execute an operation Verify (TEID=KDF (MID, Basename)), which may include an operation Read (MID) when the MasterID is locally stored. Such operations may ensure that the TEE of the prover device 84 may locally enforce and/or manage the identity of the prover device 84 according to a policy (e.g., security policy, privacy policy, etc.) specified by a physical owner of the prover device 84.

The prover device 84 may also issue an S3 message 91, which may include a Taskinfo value that may be verified by the verifier device 83 using an instruction 92 to execute an operation Verify (Taskinfo) for determining a level of trust for the TEE. In the illustrated example, the prover device 84 also issues an acknowledgement message 93, which may acknowledge the TEID value and the Basename value as a session identifier. For example, the acknowledgement message 93 may include (TEID, Basename)/"acknowledged as session ID"/.

The verifier device 83 and the prover device 84 may then begin a further exchange 94 using appropriate session keys. For example, the verifier device 83 may request additional information from the prover device 84 including invocation of exposed interfaces. In addition, the prover device 83 may provide a capability assignment to the verifier device 84, and so on. Moreover, the verifier device 83 may assign constraints on capabilities, assign access privileges, assign constraints on access privileges, provision rule sets, forward interaction rules, invoke operational states, initiate a service, terminate a service, and so on.

Additionally, the prover device 84 may directly communicate with other devices within the same group created by the verifier device 83, including participants (e.g., members) that use the same Basename value, to share and/or discover additional (e.g., private) information such as capabilities. In one example, the prover device 84 may communicate with other devices after establishing that the other devices are members of a same group as the device 84. In addition, the prover device 84 may interact directly with other members of the same group as the device 84 to provide data and/or a function without the involvement from the verifier device 83, e.g., as a proxy.

Figure 4:
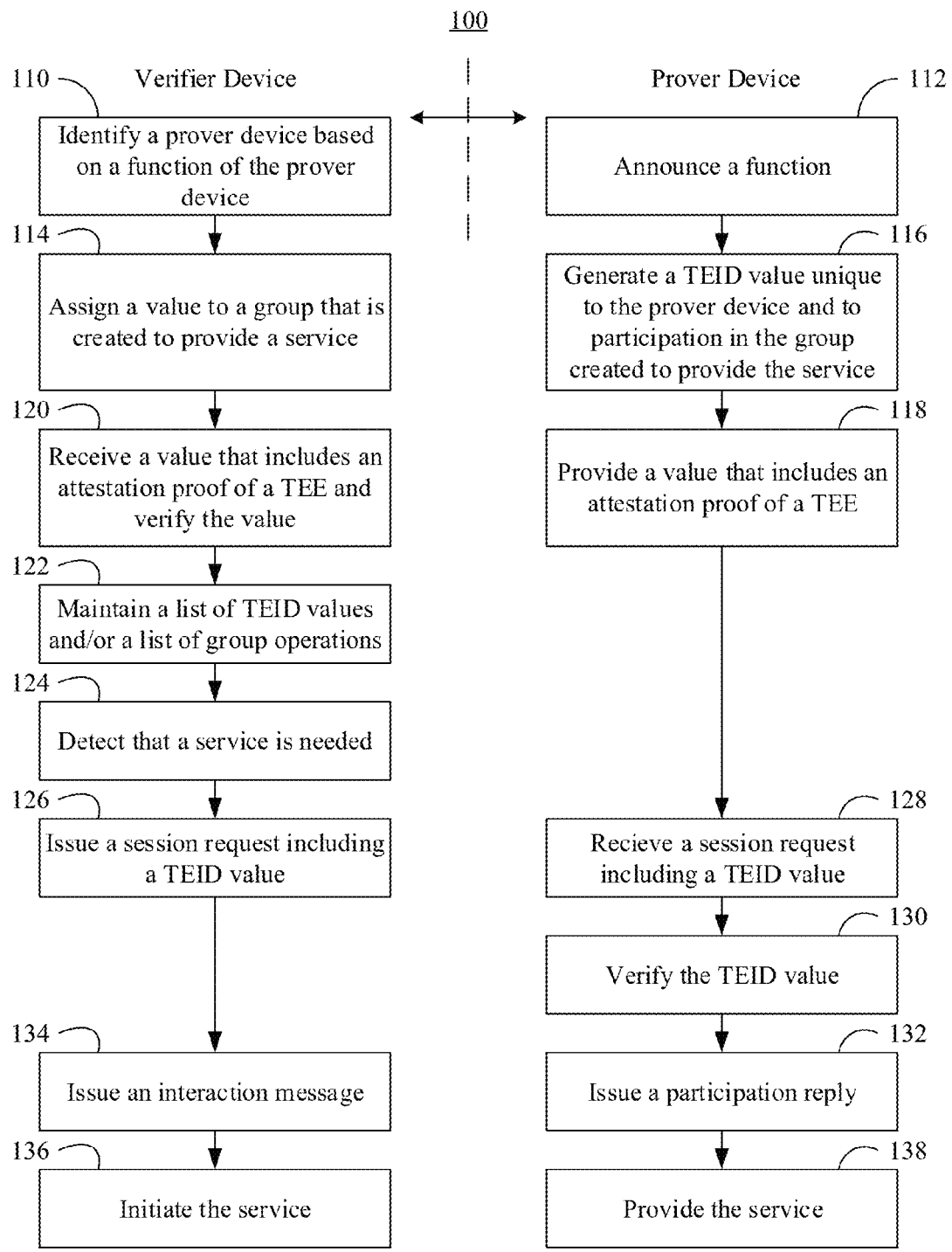
FIG. 4 is a block diagram of an example of a method of registering a prover device with a verifier device based on a TEID and/or soliciting the prover device for participation in a group that is created to provide a service according to an embodiment.

FIG. 4 shows an example of a method 100 of registering a prover device with a verifier device based on a TEID and soliciting the prover device for participation in a group that is created to provide a service according to an embodiment. The method 100 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 100 may be written in any combination of one or more programming languages, including an object oriented programming language such as C++ or the like and conventional procedural programming languages, such as the "C" programming language or similar programming languages. Moreover, the method 100 may be implemented using any of the herein mentioned circuit technologies.

Illustrated processing block 110 identifies a prover device based on a function of the prover device for contribution to a service offered by a verifier device. Illustrated processing block 112 announces a function of a prover device that is accessible for use to provide a service. Thus, the verifier device and the prover device may communicate information indicating that the prover device may contribute to a service offered by the verifier device based on the function (e.g., resource, etc.) of the prover device.

Illustrated processing block 114 assigns a value (e.g., Basename) to a group that is created to provide the service. In addition, illustrated processing block 116 generates a TEID value that is unique to the prover device and to participation by the prover device in the group that is created to provide the service. In one example, the value that identifies the group may be issued to the prover device for use to generate the TEID. Thus, for example, the TEID may be derived from a combination of a unique value (e.g., MasterID) that is generated in a trusted execution environment (TEE) of the prover device and the value that identifies the group supplied by the verifier device.

The illustrated processing block 116 may apply a key derivation function to combine at least a private key specific to the TEE (e.g., TEE_key) and a random or pseudo random number (e.g., Rand) to generate the unique number (e.g., MasterID), wherein the unique number is not exposed outside of the TEE. In addition, the processing block 112 may apply a key derivation function to combine the unique number (e.g., MasterID) with the value that identifies the group (e.g., Basename) to generate the TEID.

Additionally, a setup protocol may be utilized to issue a first message (e.g., an S1 message) over a trusted connection from the prover device to the verifier device, wherein the first message may include a group identifier (e.g., GID) for an enhanced privacy identifier (EPID) group of the prover device to begin registration of the prover device as a participant in the group. Another message (e.g., an S2 message) may be issued over the trusted connection from the verifier device to the prover device, wherein the other message may include the value that identifies the group and a signature over DH values using a certificate that identifies the verifier device, and wherein each prover device that is contacted to participate in the group may receive the message to facilitate registration as a participant in the group.

A final message may be issued over the trusted connection from the prover device to the verifier device, wherein the final message may include an EPID signature of session keys (e.g., DH values) based on an EPID key of the prover device, and wherein the final message may include the TEID value to finalize the registration of the prover device as a participant in the group. A policy, of a user of the prover device, may be evaluated to determine whether to decline participation in the group, wherein the policy may include a privacy policy. Thus, the final message and/or the value that includes the attestation proof may be withheld by illustrated processing block 118 to decline participation in the group and/or the group context.

Accordingly, the information exchanged may include the Basename, TEIDs, certificates, keys, and so on. The information exchanged may also include a value that includes an attestation proof of a trusted execution environment (TEE) of the prover device, e.g., when participation in the group is accepted. Thus, the processing block 118 provides a value that includes an attestation proof of the TEE of the prover device within which the TEID value is generated. In addition, illustrated processing block 120 receives the value that includes the attestation proof of the TEE, and verifies the value to determine a level of trust for the TEE of the prover device.

Illustrated processing block 122 maintains a list of TEID values as the only identifiers for each prover device that is a participant of the group. Thus, the list of TEID values may be referenced when a service is needed. In addition, the processing block 122 maintains a list of group operations that specify an interaction for one or more prover devices that are participants of the group. Thus, the list of group operations may be referenced to provide a service.

Illustrated processing block 124 detects that the service is needed. For example, user input from a UI of the verifier device may be identified to detect that the service is needed. Illustrated processing block 126 issues a session request including a TEID value that is stored external to prover device for verification by the prover device. For example, the processing block 126 may contact the prover device to provide the service (e.g., confirm participation) when the service is needed. In response, illustrated processing block 128 receives the session request including the TEID value, and illustrated processing block 130 verifies the TEID value in the session request to determine whether to respond to the request.

Accordingly, the processing block 130 may receive the value that identifies the group (e.g., Basename) in the session request that is stored external to the prover device and may generate a re-derived TEID based on a combination of the unique value (e.g., MasterID) internal to the TEE that is not exposed outside of the TEE and the value that identifies the group (e.g., Basename) in the session request. In addition, the processing block 130 may compare the TEID value in the session request with the re-derived TEID to determine whether a match exists to verify the TEID that was received in the session request.

Illustrated processing block 132 issues a participation reply when the TEID value is verified. In one example, the participation reply may include a capability assignment, an acknowledgment, and so on. In addition, illustrated processing block 134 issues an interaction message. In one example, the interaction message may specify an interaction rule for one or more prover devices that are participants of the group, wherein the interaction rule may include an access privilege, a constraint on the access privilege, and/or a rule set describing at least one participant of the group and an interface of the at least one participant that is available for invocation.

Illustrated processing block 136 initiates a service. For example, the processing block 136 may invoke the prover device to enter one or more operation states, wherein at least one operational state may include a peer-to-peer state that is to exclude the verifier device as a proxy. In response, illustrated processing block 138 provides the service. For example, the function of the prover device may be accessible for use to provide the service.

Accordingly, the service may be provided using TEIDs that may exist as long as the group context exists. In addition, security and/or privacy may be provided by the setup and/or usage protocols used to generate and/or use the TEIDs. For example, encryption, security, and/or verification measures may be taken to ensure that the information that is shared may be trusted from legitimate sources. In addition, the TEIDs may not be used to discover private and/or secure information about a prover device, a user, a usage context, and so on. In addition, a prover device may generate a relatively large number of TEIDs for a relatively large number of group contexts, and therefore may relatively increase services that may be provided.

Figure 5:
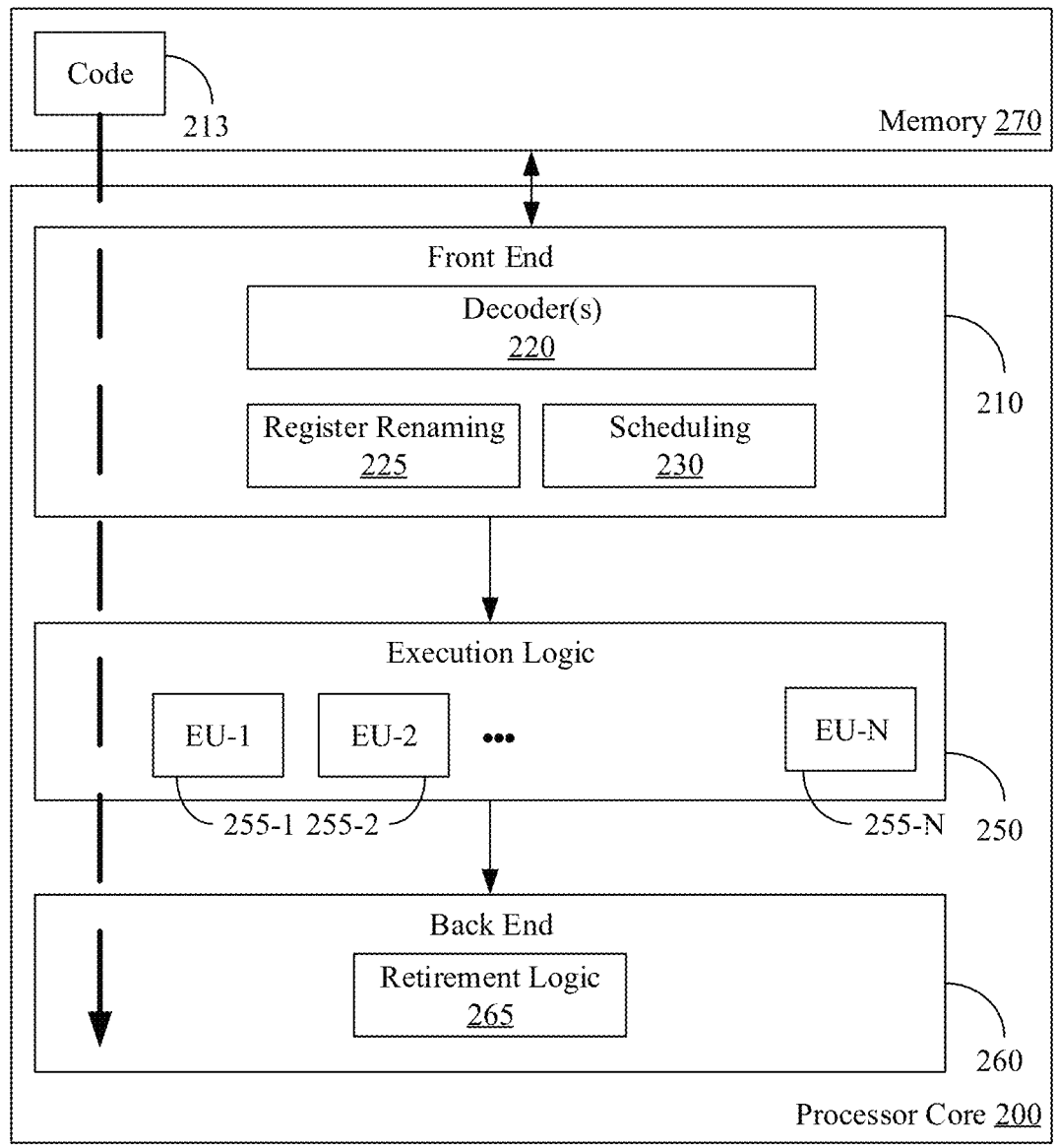
FIG. 5 is a block diagram of an example of a processor according to an embodiment.

FIG. 5 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the blocks of the method 100 (FIG. 4), already discussed. In one example, the memory 270 is non-flash memory. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 6:
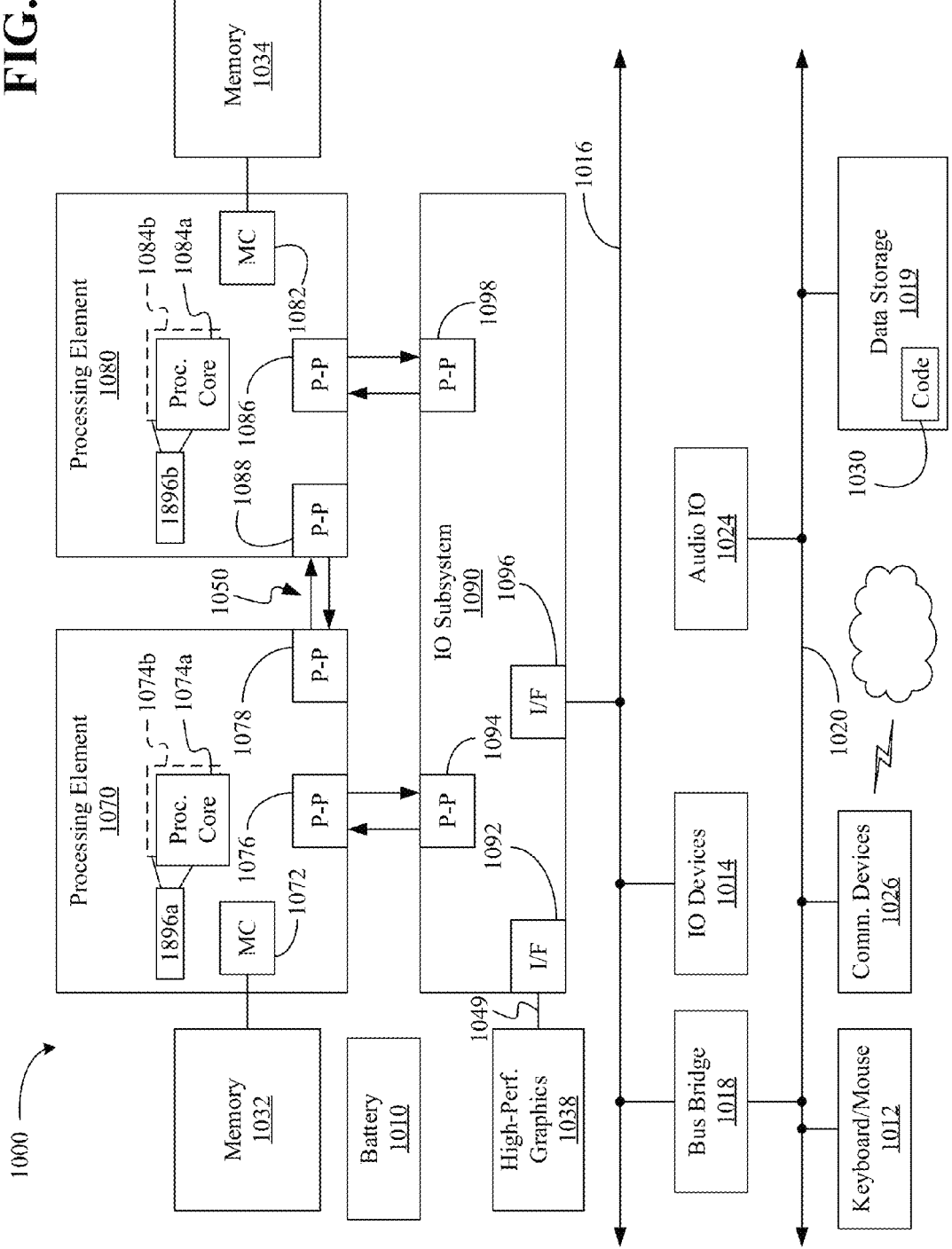
FIG. 6 is a block diagram of an example of a computing system according to an embodiment.

Referring now to FIG. 6, shown is a block diagram of a computing system 1000 embodiment in accordance with an embodiment. Shown in FIG. 6 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 5.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 6, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 6, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the blocks of the method 100 (FIG. 4), already discussed, and may be similar to the code 213 (FIG. 5), already discussed. Further, an audio I/O 1024 may be coupled to second bus 1020 and a battery 1010 may supply power to the computing system 1000.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6.

Additional Notes and Examples

Example 1 may include a verifier device comprising a discoverer to identify a prover device based on a function of the prover device for contribution to a service offered by the verifier device, and a group generator to assign a value to a group that is to be created to provide the service, wherein the value is to identify the group and is to be issued to the prover device for use to generate a trusted ephemeral identifier (TEID) value that is unique to the prover device and to participation of the prover device in the group, and wherein the TEID is to be stored at a storage device of the verifier device.

Example 2 may include the verifier device of Example 1, wherein the group generator is further to issue a message over a trusted connection, wherein the message is to include the value that is to identify the group and a signature using a certificate that is to identify the verifier device, and wherein each prover device that is to be contacted to participate in the group is to receive the message to facilitate registration as a participant in the group, and exchange information over the trusted connection, wherein the information is to include the TEID value.

Example 3 may include the verifier device of any one of Examples 1 to 2, wherein the group generator is further to receive a value that is to include an attestation proof of a trusted execution environment (TEE) of the prover device within which the TEID value is to be generated, and verify the value that is to include the attestation proof to determine a level of trust for the TEE of the prover device.

Example 4 may include the verifier device of any one of Examples 1 to 3, wherein the group generator is further to maintain a list of TEID values as the only identifiers for each prover device that is to be a participant of the group, and maintain a list of group operations that are to specify an interaction for one or more prover devices that are to be participants of the group.

Example 5 may include the verifier device of any one of Examples 1 to 4, further including a servicer to detect that the service is to be needed, and contact the prover device to provide the service when the service is needed, wherein the servicer is to issue a session request including the TEID value for verification by the prover device.

Example 6 may include the verifier device of any one of Examples 1 to 5, wherein servicer is further to issue an interaction message to specify an interaction rule for one or more prover devices that are to be participants of the group, wherein the interaction rule is to include one or more of an access privilege, a constraint on the access privilege, and a rule set describing at least one participant of the group and an interface of the at least one participant that is to be available for invocation.

Example 7 may include the verifier device of any one of Examples 1 to 6, wherein the servicer is further to, initiate the service, wherein the function of the prover device is to be accessible for use to provide the service, and invoke the prover device to enter one or more operational states, wherein at least one operational state is to include a peer-to-peer state that is to exclude the verifier device as a proxy.

Example 8 may include at least one computer readable storage medium comprising a set of instructions which, when executed by a verifier device, cause the verifier device to identify a prover device based on a function of the prover device for contribution to a service offered by the verifier device, and assign a value to a group that is to be created to provide the service, wherein the value is to identify the group and is to be issued to the prover device for use to generate a trusted ephemeral identifier (TEID) value that is unique to the prover device and to participation of the prover device in the group.

Example 9 may include the at least one computer readable storage medium of Example 8, wherein the instructions, when executed, cause the verifier device to issue a message over a trusted connection, wherein the message is to include the value that is to identify the group and a signature using a certificate that is to identify the verifier device, and wherein each prover device that is to be contacted to participate in the group is to receive the message to facilitate registration as a participant in the group, and exchange information over the trusted connection, wherein the information is to include the TEID value.

Example 10 may include the at least one computer readable storage medium of any one of Examples 8 to 9, wherein the instructions, when executed, cause the verifier device to receive a value that is to include an attestation proof of a trusted execution environment (TEE) of the prover device within which the TEID value is to be generated, and verify the value that is to include the attestation proof to determine a level of trust for the TEE of the prover device.

Example 11 may include the at least one computer readable storage medium of any one of Examples 8 to 10, wherein the instructions, when executed, cause the verifier device to maintain a list of TEID values as the only identifiers for each prover device that is to be a participant of the group, and maintain a list of group operations that are to specify an interaction for one or more prover devices that are to be participants of the group.

Example 12 may include the at least one computer readable storage medium of any one of Examples 8 to 11, wherein the instructions, when executed, cause the verifier device to detect that the service is to be needed, and contact the prover device to provide the service when the service is needed, wherein the servicer is to issue a session request including the TEID value for verification by the prover device.

Example 13 may include the at least one computer readable storage medium of any one of Examples 8 to 12, wherein the instructions, when executed, cause the verifier device to issue an interaction message to specify an interaction rule for one or more prover devices that are to be participants of the group, wherein the interaction rule is to include one or more of an access privilege, a constraint on the access privilege, and a rule set describing at least one participant of the group and an interface of the at least one participant that is to be available for invocation, initiate the service, wherein the function of the prover device is to be accessible for use to provide the service, and invoke the prover device to enter one or more operational states, wherein at least one operational state is to include a peer-to-peer state that is to exclude the verifier device as a proxy.

Example 14 may include a method to create a group to provide a service comprising identifying a prover device based on a function of the prover device for contribution to a service offered by the verifier device, and assigning a value to a group that is created to provide the service, wherein the value identifies the group and is issued to the prover device for use to generate a trusted ephemeral identifier (TEID) value that is unique to the prover device and to participation of the prover device in the group.

Example 15 may include the method of claim 14, further including issuing a message over a trusted connection, wherein the message includes the value that identifies the group and a signature using a certificate that identifies the verifier device, and wherein each prover device that is contacted to participate in the group receives the message to facilitate registration as a participant in the group, and exchanging information over the trusted connection, wherein the information includes the TEID value.

Example 16 may include the method of any one of Examples 14 to 15, further including receiving a value that includes an attestation proof of a trusted execution environment (TEE) of the prover device within which the TEID value is generated, and verifying the value that includes the attestation proof to determine a level of trust for the TEE of the prover device.

Example 17 may include the method of any one of Examples 14 to 16, further including maintaining a list of TEID values as the only identifiers for each prover device that is a participant of the group, and maintain a list of group operations that specify an interaction for one or more prover devices that are participants of the group.

Example 18 may include the method of any one of Examples 14 to 17, further including detecting that the service is needed, contacting the prover device to provide the service when the service is needed, and issuing a session request including the TEID value for verification by the prover device.

Example 19 may include the method of any one of Examples 14 to 18, further including issuing an interaction message to specify an interaction rule for one or more prover devices that are participants of the group, wherein the interaction rule includes one or more of an access privilege, a constraint on the access privilege, and a rule set describing at least one participant of the group and an interface of the at least one participant that is available for invocation, initiating the service, wherein the function of the prover device is accessible for use to provide the service, and invoking the prover device to enter one or more operational states, wherein at least one operational state includes a peer-to-peer state that is to exclude the verifier device as a proxy.

Example 20 may include a prover device comprising an advertiser to announce a function of the prover device that is to be accessible for use to provide a service, and an issuer to generate a trusted ephemeral identifier (TEID) value that is unique to the prover device and to participation by the prover device in a group that is to be created to provide the service, wherein the TEID is to be derived from a combination of a unique value that is to be generated in a trusted execution environment (TEE) of the prover device and a value that is to identify the group to provide the service, and wherein the unique value is to be stored at a storage device of the TEE.

Example 21 may include the prover device of Example 20, wherein the issuer is further to issue a first message over a trusted connection, wherein the first message is to include a group identifier for an enhanced privacy identifier (EPID) group of the prover device to begin registration of the prover device as a participant in the group, and issue a final message over the trusted connection, wherein the final message is to include an EPID signature of session keys based on an EPID key of the prover device, and wherein the final message is to include the TEID value to finalize the registration of the prover device as a participant in the group.

Example 22 may include the prover device of any one of Examples 20 to 21, wherein the issuer is further to evaluate a policy of a user of the prover device to determine whether to decline participation in the group based on policy, wherein the policy is to include a privacy policy, and provide a value that is to include an attestation proof of the TEE of the prover device when participation in the group is to be accepted.

Example 23 may include the prover device of any one of Examples 20 to 22, wherein the issuer is further to apply a key derivation function to combine at least a private key specific to the TEE and a random or pseudo random number to generate the unique number, wherein the unique number is not to be exposed outside of the TEE, and apply a key derivation function to combine the unique number with the value that is to identify the group to generate the TEID.

Example 24 may include the prover device of any one of Examples 20 to 23, wherein the TEID value is to be stored external to the prover device, and wherein the prover device further is to include a participator to receive a session request to create a session over a trusted connection, wherein the session request is to include the TEID value that is to be stored external to the prover device, verify the TEID value in the session request to determine whether to respond to the request, issue a participation reply when the TEID value is verified, and make the function of the prover device accessible for use to provide the service.

Example 25 may include the prover device of any one of Examples 20 to 24, wherein the value that is to identify the group is to be stored external to the prover device, and wherein the participator is further to, receive the value that is to identify the group in the session request, generate a re-derived TEID based on a combination of the unique value and the value that is to identify the group in the session request, and compare the TEID value in the session request with the re-derived TEID to determine whether a match exists to verify the TEID in the session request.

Example 26 may include at least one computer readable storage medium comprising a set of instructions which, when executed by a prover device, cause the prover device announce a function of the prover device that is to be accessible for use to provide a service, and generate a trusted ephemeral identifier (TEID) value that is unique to the prover device and to participation by the prover device in a group that is to be created to provide the service, wherein the TEID is to be derived from a combination of a unique value that is to be generated in a trusted execution environment (TEE) of the prover device and a value that is to identify the group to provide the service.

Example 27 may include the at least one computer readable storage medium of Example 26, wherein the instructions, when executed, cause the prover device to issue a first message over a trusted connection, wherein the first message is to include a group identifier for an enhanced privacy identifier (EPID) group of the prover device to begin registration of the prover device as a participant in the group, and issue a final message over the trusted connection, wherein the final message is to include an EPID signature of session keys based on an EPID key of the prover device, and wherein the final message is to include the TEID value to finalize the registration of the prover device as a participant in the group.

Example 28 may include the at least one computer readable storage medium of any one of Examples 26 to 27, wherein the instructions, when executed, cause the prover device to evaluate a policy of a user of the prover device to determine whether to decline participation in the group based on policy, wherein the policy is to include a privacy policy, and provide a value that is to include an attestation proof of the TEE of the prover device when participation in the group is to be accepted.

Example 29 may include the at least one computer readable storage medium of any one of Examples 26 to 28, wherein the instructions, when executed, cause the prover device to apply a key derivation function to combine at least a private key specific to the TEE and a random or pseudo random number to generate the unique number, wherein the unique number is not to be exposed outside of the TEE, and apply a key derivation function to combine the unique number with the value that is to identify the group to generate the TEID.

Example 30 may include the at least one computer readable storage medium of any one of Examples 26 to 29, wherein the TEID value is to be stored external to the prover device, and wherein the instructions, when executed, cause the prover device to: receive a session request to create a session over a trusted connection, wherein the session request is to include the TEID value that is to be stored external to the prover device, verify the TEID value in the session request to determine whether to respond to the request, issue a participation reply when the TEID value is verified, and make the function of the prover device accessible for use to provide the service.

Example 31 may include the at least one computer readable storage medium of any one of Examples 26 to 30, wherein the value that is to identify the group is to be stored external to the prover device, and wherein the instructions, when executed, cause the prover device to receive the value that is to identify the group in the session request, generate a re-derived TEID based on a combination of the unique value and the value that is to identify the group in the session request, and compare the TEID value in the session request with the re-derived TEID to determine whether a match exists to verify the TEID in the session request.

Example 32 may include a method to generate an identifier to participate in a service comprising announcing a function of a prover device that is accessible for use to provide a service, and generating a trusted ephemeral identifier (TEID) value that is unique to the prover device and to participation by the prover device in a group that is created to provide the service, wherein the TEID is derived from a combination of a unique value that is generated in a trusted execution environment (TEE) of the prover device and a value that identifies the group to provide the service.

Example 33 may include the method of claim 32, further including issuing a first message over a trusted connection, wherein the first message includes a group identifier for an enhanced privacy identifier (EPID) group of the prover device to begin registration of the prover device as a participant in the group, and issuing a final message over the trusted connection, wherein the final message includes an EPID signature of session keys based on an EPID key of the prover device, and wherein the final message includes the TEID value to finalize the registration of the prover device as a participant in the group.

Example 34 may include the method of any one of Examples 32 to 33, further including evaluating a policy of a user of the prover device to determine whether to decline participation in the group based on policy, wherein the policy includes a privacy policy, and providing a value that includes an attestation proof of the TEE of the prover device when participation in the group is accepted.

Example 35 may include the method of any one of Examples 32 to 34, further including applying a key derivation function to combine at least a private key specific to the TEE and a random or pseudo random number to generate the unique number, wherein the unique number is not exposed outside of the TEE, and applying a key derivation function to combine the unique number with the value that identifies the group to generate the TEID.

Example 36 may include the method of any one of Examples 32 to 35, further including wherein the TEID value is stored external to the prover device, and wherein the method further includes receiving a session request to create a session over a trusted connection, wherein the session request includes the TEID value that is stored external to the prover device, verifying the TEID value in the session request to determine whether to respond to the request, issuing a participation reply when the TEID value is verified; and, making the function of the prover device accessible for use to provide the service.

Example 37 may include the method of any one of Examples 32 to 36, further including wherein the value that identifies the group is stored external to the prover device, and wherein method further includes receiving the value that identifies the group in the session request, generating a re-derived TEID based on a combination of the unique value and the value that identifies the group in the session request, and comparing the TEID value in the session request with the re-derived TEID to determine whether a match exists to verify the TEID in the session request.

Example 38 may include a verifier device comprising means for performing the method of any of Examples 14 to 19.

Example 39 may include a prover device comprising means for performing the method of any of Examples 32 to 37.

Thus, techniques described herein may provide an approach that allows identifiers to be protected by a TEE within a device and never revealed. In addition, the identifiers may be used to establish proper group participation with relatively low resource requirements (e.g., memory, etc.). Thus, entropic identifiers may be generated within a TEE (e.g., hypervisor, etc.) using, e.g., DRNG technology, wherein a MasterID is not exposed outside of the TEE, and wherein ephemeral identifiers (e.g., temporal identifiers) may be created using the MasterID and another value supplied by a group leader (e.g., device, domain controller, etc.) and only known within group leader context.

Moreover, ephemeral identifiers may be verified by prover devices that posses the MasterID such that participation in the group transaction may be subject to review by a privacy/security policy under the control of an owner of the prover device. In addition, a group leader may mange prover device (e.g., sensor) participation in an IoT application including peer-to-peer interactions among the devices that are also enlisted in the group that generate and use their own ephemeral identifiers. Additionally, the ephemeral identifiers need not be stored locally by the prover devices, but may be stored by the group leader device and validated upon use via a session wherein there may be session symmetric keys to secure a channel between the prover device and the group leader or between prover devices. Further, there may be a discovery protocol that allows some capabilities of the prover device to be published with a discovery service, wherein additional (e.g., private) information such as capabilities may be further discovered.

Accordingly, techniques may provide for a MasterID that is never revealed outside of a TEE, use of a TEID that is computed using the MasterID and a Basename value supplied by a group leader device, use of a protocol for negotiating a TEID values and/or for registering a prover device with an IoT group leader context. In addition, techniques may provide a protocol for validating group membership using a TEID by a participant device, use of a privacy and/or security policy by a participant device to abstain from participation in a group context or application, use of a group leader device to create an IoT application context using TEID values wherein context state may be held by the group leader device and wherein the participant devices may remain stateless to the IoT application, and use of a participant device to simultaneously participate in an unlimited number of IoT applications or group contexts.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. A verifier device comprising:
   a discoverer, implemented at least partly in one or more of configurable logic or fixed functionality logic hardware, to identify a prover device based on a function of the prover device for contribution to a service offered by the verifier device;
   a group generator, implemented at least partly in one or more of configurable logic or fixed functionality logic hardware, to assign a value to a group that is created to provide the service, wherein the value identifies the group and is issued to the prover device to generate a trusted ephemeral identifier (TEID) value that is unique to the prover device and to participation of the prover device in the group; and a servicer, implemented at least partly in one or more of configurable logic or fixed functionality logic hardware, to:
  detect that the service is needed;
  contact the prover device to provide the service when the service is needed; and
  issue a session request including the TEID value for verification by the prover device.

2. The verifier device of claim 1, wherein the group generator is further to:
  issue a message over a trusted connection, wherein the message includes the value that identifies the group and a signature using a certificate that identifies the verifier device, and wherein each prover device that is contacted to participate in the group receives the message to facilitate registration as a participant in the group; and
  exchange information over the trusted connection, wherein the information includes the TEID value.

3. The verifier device of claim 1, wherein the group generator is further to:
  receive a value that includes an attestation proof of a trusted execution environment (TEE) of the prover device within which the TED value is generated; and
  verify the value that includes the attestation proof to determine a level of trust for the TEE of the prover device.

4. The verifier device of claim 1, wherein the group generator is further to:
  maintain a list of TED values as the only identifiers for each prover device that is a participant of the group; and
  maintain a list of group operations that specify an interaction for one or more prover devices that are participants of the group.

5. The verifier device of claim 1, wherein servicer is further to issue an interaction message to specify an interaction rule for one or more prover devices that are participants of the group, wherein the interaction rule includes one or more of an access privilege, a constraint on the access privilege, and a rule set describing at least one participant of the group and an interface of the at least one participant that is available for invocation.

6. The verifier device of claim 1, wherein the servicer is further to:
  initiate the service, wherein the function of the prover device is accessible for use to provide the service; and
  invoke the prover device to enter one or more operational states, wherein at least one operational state includes a peer-to-peer state that excludes the verifier device as a proxy.

7. At least one non-transitory computer readable storage medium comprising a set of instructions which, when executed by a verifier device, cause the verifier device to:
  identify a prover device based on a function of the prover device for contribution to a service offered by the verifier device;
  assign a value to a group that is created to provide the service, wherein the value identifies the group and is issued to the prover device to generate a trusted ephemeral identifier (TEID) value that is unique to the prover device and to participation of the prover device in the group;
  detect that the service is needed;
  contact the prover device to provide the service when the service is needed; and
  issue a session request including the TEID value for verification by the prover device.

8. The at least one computer readable storage medium of claim 7, wherein the instructions, when executed, cause the verifier device to:
  issue a message over a trusted connection, wherein the message includes the value that identifies the group and a signature using a certificate that identifies the verifier device, and wherein each prover device that is contacted to participate in the group receives the message to facilitate registration as a participant in the group; and
  exchange information over the trusted connection, wherein the information includes the TEID value.

9. The at least one computer readable storage medium of claim 7, wherein the instructions, when executed, cause the verifier device to:
  receive a value that includes an attestation proof of a trusted execution environment (TEE) of the prover device within which the TEID value is generated; and
  verify the value that includes the attestation proof to determine a level of trust for the TEE of the prover device.

10. The at least one computer readable storage medium of claim 7, wherein the instructions, when executed, cause the verifier device to:
  maintain a list of TED values as the only identifiers for each prover device that is a participant of the group; and
  maintain a list of group operations that are to specify an interaction for one or more prover devices that are participants of the group.

11. The at least one computer readable storage medium of claim 7, wherein the instructions, when executed, cause the verifier device to:
  issue an interaction message to specify an interaction rule for one or more prover devices that are participants of the group, wherein the interaction rule includes one or more of an access privilege, a constraint on the access privilege, and a rule set describing at least one participant of the group and an interface of the at least one participant that is available for invocation;
  initiate the service, wherein the function of the prover device is accessible for use to provide the service; and
  invoke the prover device to enter one or more operational states, wherein at least one operational state includes a peer-to-peer state that excludes the verifier device as a proxy.

12. A prover device comprising:
  an advertiser, implemented at least partly in one or more of configurable logic or fixed functionality logic hardware, to announce a function of the prover device that is accessible for use to provide a service;
  an issuer, implemented at least partly in one or more of configurable logic or fixed functionality logic hardware, to generate a trusted ephemeral identifier (TEID) value that is unique to the prover device and to participation by the prover device in a group that is created to provide the service, wherein the TEID value is derived from a combination of a unique value that is generated in a trusted execution environment (TEE) of the prover device and a value that identifies the group to provide the service, and wherein the TEID value is stored external to the prover device; and
  a participator, implemented at least partly in one or more of configurable logic or fixed functionality logic hardware, to:

receive a session request to create a session over a trusted connection, wherein the session request includes the TEID value that is stored external to the prover device;

verify the TEID value in the session request to determine whether to respond to the request;

issue a participation reply when the TEID value is verified; and make the function of the prover device accessible for use to provide the service.

13. The prover device of claim 12, wherein the issuer is further to:

issue a first message over a trusted connection, wherein the first message includes a group identifier for an enhanced privacy identifier (EPID) group of the prover device to begin registration of the prover device as a participant in the group; and issue a final message over the trusted connection, wherein the final message includes an EPID signature of session keys based on an EPID key of the prover device, and wherein the final message includes the TEID value to finalize the registration of the prover device as a participant in the group.

14. The prover device of claim 12, wherein the issuer is further to:

evaluate a policy of a user of the prover device to determine whether to decline participation in the group based on policy, wherein the policy includes a privacy policy; and provide a value that includes an attestation proof of the TEE of the prover device when participation in the group is accepted.

15. The prover device of claim 12, wherein the issuer is further to:

apply a key derivation function to combine at least a private key specific to the TEE and a random or pseudo random number to generate the unique number, wherein the unique number is not exposed outside of the TEE; and apply a key derivation function to combine the unique number with the value that identifies the group to generate the TEID value.

16. The prover device of claim 12, wherein the value that identifies the group is stored external to the prover device, and wherein the participator is further to:

receive the value that identifies the group in the session request;

generate a re-derived TEID value based on a combination of the unique value and the value that identifies the group in the session request; and compare the TEID value in the session request with the re-derived TEID value to determine whether a match exists to verify the TEID value in the session request.

17. At least one non-transitory computer readable storage medium comprising a set of instructions which, when executed by a prover device, cause the prover device to:

announce a function of the prover device that is accessible for use to provide a service;

generate a trusted ephemeral identifier (TEID) value that is unique to the prover device and to participation by the prover device in a group that is created to provide the service, wherein the TEID value is derived from a combination of a unique value that is generated in a trusted execution environment (TEE) of the prover device and a value that identifies the group to provide the service, and wherein the TEID value is stored external to the prover device;

receive a session request to create a session over a trusted connection, wherein the session request includes the TEID value that is stored external to the prover device;

verify the TEID value in the session request to determine whether to respond to the request;

issue a participation reply when the TEID value is verified; and make the function of the prover device accessible for use to provide the service.

18. The at least one computer readable storage medium of claim 17, wherein the instructions, when executed, cause the prover device to:

issue a first message over a trusted connection, wherein the first message includes a group identifier for an enhanced privacy identifier (EPID) group of the prover device to begin registration of the prover device as a participant in the group; and issue a final message over the trusted connection, wherein the final message includes an EPID signature of session keys based on an EPID key of the prover device, and wherein the final message includes the TEID value to finalize the registration of the prover device as a participant in the group.

19. The at least one computer readable storage medium of claim 17, wherein the instructions, when executed, cause the prover device to:

evaluate a policy of a user of the prover device to determine whether to decline participation in the group based on policy, wherein the policy includes a privacy policy; and provide a value that includes an attestation proof of the TEE of the prover device when participation in the group is accepted.

20. The at least one computer readable storage medium of claim 17, wherein the instructions, when executed, cause the prover device to:

apply a key derivation function to combine at least a private key specific to the TEE and a random or pseudo random number to generate the unique number, wherein the unique number is not exposed outside of the TEE; and apply a key derivation function to combine the unique number with the value that identifies the group to generate the TEID value.

21. The at least one computer readable storage medium of claim 17, wherein the value that is to identify the group is to be stored external to the prover device, and wherein the instructions, when executed, cause the prover device to:

receive the value that identifies the group in the session request;

generate a re-derived TED value based on a combination of the unique value and the value that identifies the group in the session request; and compare the TEID value in the session request with the re-derived TED value to determine whether a match exists to verify the TED value in the session request.

22. A verifier device comprising:

a discoverer, implemented at least partly in one or more of configurable logic or fixed functionality logic hardware, to identify a prover device based on a function of the prover device for contribution to a service offered by the verifier device; and a group generator, implemented at least partly in one or more of configurable logic or fixed functionality logic hardware, to:

assign a value to a group that is created to provide the service, wherein the value identifies the group and is issued to the prover device to generate a trusted ephemeral identifier (TEID) value that is unique to the prover device and to participation of the prover device in the group;
issue a message over a trusted connection, wherein the message includes the value that identifies the group and a signature using a certificate that identifies the verifier device, and wherein each prover device that is contacted to participate in the group receives the message to facilitate registration as a participant in the group; and
exchange information over the trusted connection, wherein the information includes the TED value.

23. A verifier device comprising:
a discoverer, implemented at least partly in one or more of configurable logic or fixed functionality logic hardware, to identify a prover device based on a function of the prover device for contribution to a service offered by the verifier device; and
a group generator, implemented at least partly in one or more of configurable logic or fixed functionality logic hardware, to:
assign a value to a group that is created to provide the service, wherein the value identifies the group and is issued to the prover device to generate a trusted ephemeral identifier (TEID) value that is unique to the prover device and to participation of the prover device in the group;
receive a value that includes an attestation proof of a trusted execution environment (TEE) of the prover device within which the TEID value is generated; and
verify the value that includes the attestation proof to determine a level of trust for the TEE of the prover device.

24. A verifier device comprising:
a discoverer, implemented at least partly in one or more of configurable logic or fixed functionality logic hardware, to identify a prover device based on a function of the prover device for contribution to a service offered by the verifier device; and
a group generator, implemented at least partly in one or more of configurable logic or fixed functionality logic hardware, to:
assign a value to a group that is created to provide the service, wherein the value identifies the group and is issued to the prover device to generate a trusted ephemeral identifier (TEID) value that is unique to the prover device and to participation of the prover device in the group;
maintain a list of TEID values as the only identifiers for each prover device that is a participant of the group; and
maintain a list of group operations that specify an interaction for one or more prover devices that are participants of the group.

25. A prover device comprising:
an advertiser, implemented at least partly in one or more of configurable logic or fixed functionality logic hardware, to announce a function of the prover device that is accessible for use to provide a service; and
an issuer, implemented at least partly in one or more of configurable logic or fixed functionality logic hardware, to:
generate a trusted ephemeral identifier (TEID) value that is unique to the prover device and to participation by the prover device in a group that is created to provide the service, wherein the TEID value is derived from a combination of a unique value that is generated in a trusted execution environment (TEE) of the prover device and a value that identifies the group to provide the service, and wherein the TEID value is stored external to the prover device;
issue a first message over a trusted connection, wherein the first message includes a group identifier for an enhanced privacy identifier (EPID) group of the prover device to begin registration of the prover device as a participant in the group; and
issue a final message over the trusted connection, wherein the final message includes an EPID signature of session keys based on an EPID key of the prover device, and wherein the final message includes the TEID value to finalize the registration of the prover device as a participant in the group.

26. A prover device comprising:
an advertiser, implemented at least partly in one or more of configurable logic or fixed functionality logic hardware, to announce a function of the prover device that is accessible for use to provide a service; and
an issuer, implemented at least partly in one or more of configurable logic or fixed functionality logic hardware, to:
generate a trusted ephemeral identifier (TEID) value that is unique to the prover device and to participation by the prover device in a group that is created to provide the service, wherein the TEID value is derived from a combination of a unique value that is generated in a trusted execution environment (TEE) of the prover device and a value that identifies the group to provide the service, and wherein the TEID value is stored external to the prover device;
evaluate a policy of a user of the prover device to determine whether to decline participation in the group based on policy, wherein the policy includes a privacy policy; and
provide a value that includes an attestation proof of the TEE of the prover device when participation in the group is accepted.

27. A prover device comprising:
an advertiser, implemented at least partly in one or more of configurable logic or fixed functionality logic hardware, to announce a function of the prover device that is accessible for use to provide a service; and
an issuer, implemented at least partly in one or more of configurable logic or fixed functionality logic hardware, to:
generate a trusted ephemeral identifier (TEID) value that is unique to the prover device and to participation by the prover device in a group that is created to provide the service, wherein the TEID value is derived from a combination of a unique value that is generated in a trusted execution environment (TEE) of the prover device and a value that identifies the group to provide the service, and wherein the TEID value is stored external to the prover device;
apply a key derivation function to combine at least a private key specific to the TEE and a random or pseudo random number to generate the unique number, wherein the unique number is not exposed outside of the TEE; and
apply a key derivation function to combine the unique number with the value that identifies the group to generate the TEID value.

* * * * *

UNITED STATES PATENT AND TRADEMARK OFFICE
CERTIFICATE OF CORRECTION

PATENT NO. : 9,635,021 B2
APPLICATION NO. : 14/574847
DATED : April 25, 2017
INVENTOR(S) : Ned M. Smith It is certified that error appears in the above-identified patent and that said Letters Patent is hereby corrected as shown below:

In the Claims

At Column 25, Claim number 3, Line number 25, delete "TED", insert --TEID--

At Column 25, Claim number 4, Line number 31, delete "TED", insert --TEID--

At Column 26, Claim number 10, Line number 27, delete "TED", insert --TEID--

At Column 28, Claim number 21, Line number 51, delete "TED", insert --TEID--

At Column 28, Claim number 21, Line number 55, delete "TED", insert --TEID--

At Column 28, Claim number 21, Line number 56, delete "TED", insert --TEID--

At Column 29, Claim number 22, Line number 13, delete "TED", insert --TEID--

At Column 30, Claim number 25, Line number 1, delete "TED", insert --TEID--

Signed and Sealed this
Nineteenth Day of June, 2018

Andrei Iancu
*Director of the United States Patent and Trademark Office*